(12) United States Patent
Venkatachalam

(10) Patent No.: US 7,746,896 B2
(45) Date of Patent: Jun. 29, 2010

(54) BASE STATION AND METHOD FOR ALLOCATING BANDWIDTH IN A BROADBAND WIRELESS NETWORK WITH REDUCED LATENCY

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1071 days.

(21) Appl. No.: 11/267,037

(22) Filed: Nov. 4, 2005

(65) Prior Publication Data

US 2007/0104221 A1  May 10, 2007

(51) Int. Cl.
*H04J 3/16* (2006.01)
(52) U.S. Cl. .................. 370/468; 370/346; 370/349; 370/449
(58) Field of Classification Search .............. 370/310, 370/328, 335, 336, 337, 342, 343–349, 449, 370/468; 455/177.1, 266, 200.1, 452.2, 450
See application file for complete search history.

(56) References Cited

U.S. PATENT DOCUMENTS

| | | | |
|---|---|---|---|
| 2001/0038620 A1* | 11/2001 | Stanwood et al. ........... 370/336 |
| 2002/0071449 A1* | 6/2002 | Ho et al. ..................... 370/447 |
| 2002/0080816 A1* | 6/2002 | Spinar et al. ................ 370/449 |
| 2004/0047319 A1* | 3/2004 | Elg ............................ 370/338 |
| 2004/0253961 A1* | 12/2004 | Kong et al. ................. 455/450 |
| 2005/0063330 A1* | 3/2005 | Lee et al. .................... 370/328 |
| 2006/0245380 A1* | 11/2006 | Lenzini et al. .............. 370/276 |

* cited by examiner

*Primary Examiner*—Ricky Ngo
*Assistant Examiner*—Wei-Po Kao
(74) *Attorney, Agent, or Firm*—Schwegman, Lundberg & Woessner, P.A.; Gregory J. Gorrie

(57) ABSTRACT

Systems and methods for allocating bandwidth in a wireless network are generally described herein. Bandwidth is allocated to a mobile station during an established communication session through the use of a poll-me indicator in a MAC header received in an uplink data transmission from a mobile station. The poll-me indicator may indicate a request for additional bandwidth for a subsequent uplink transmission of an established communication session. The mobile station refrains from using a contention channel to request an allocation information element when the mobile station is able to set the poll-me indicator in the MAC header.

10 Claims, 4 Drawing Sheets

| FIELD | SIZE (BITS) |
|---|---|
| HT (HEADER TYPE) | 1 |
| EC (ENCRYPTION CONTROL) | 1 |
| TYPE (FOR SPECIAL PAYLOAD TYPES) | 6 |
| PM (POLL-ME) | 1 |
| CI (CYCLIC-REDUNDANCY-CHECK INDICATOR) | 1 |
| EKS (ENCRYPTION KEY SEQUENCE) | 2 |
| RESERVED | 1 |
| LEN (LENGTH) | 11 |
| CID (CONNECTION IDENTIFIER) | 16 |
| HCS (HEADER CHECK SEQUENCE) | 8 |
| TOTAL | 48 |

GENERIC MAC HEADER FIELDS

*FIG. 3*

BASE STATION AND METHOD FOR ALLOCATING BANDWIDTH IN A BROADBAND WIRELESS NETWORK WITH REDUCED LATENCY

TECHNICAL FIELD

Some embodiments of the present invention pertain to wireless communication networks. Some embodiments of the present invention pertain to broadband wireless communications and the allocation of uplink bandwidth to mobile stations in centrally-managed wireless communication networks.

BACKGROUND

In centrally-managed wireless communication networks, a base station generally manages communications with the one or more mobile stations. In these networks, the base station grants bandwidth to the mobile stations to allow the mobile stations to transmit to the base station. One problem with these networks is that the latency time for a mobile station to receive an uplink bandwidth allocation from a base station may be too great for some applications, such as push-to-talk applications and Transmission Control Protocol (TCP) type applications. Furthermore, the process of requesting and receiving bandwidth consumes unnecessary bandwidth as well as energy.

Thus, there are general needs for reducing the latency time in centrally-managed wireless communication networks.

BRIEF DESCRIPTION OF THE DRAWINGS

FIG. 3 is a table illustrating example fields of a generic media-access control (MAC) header in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
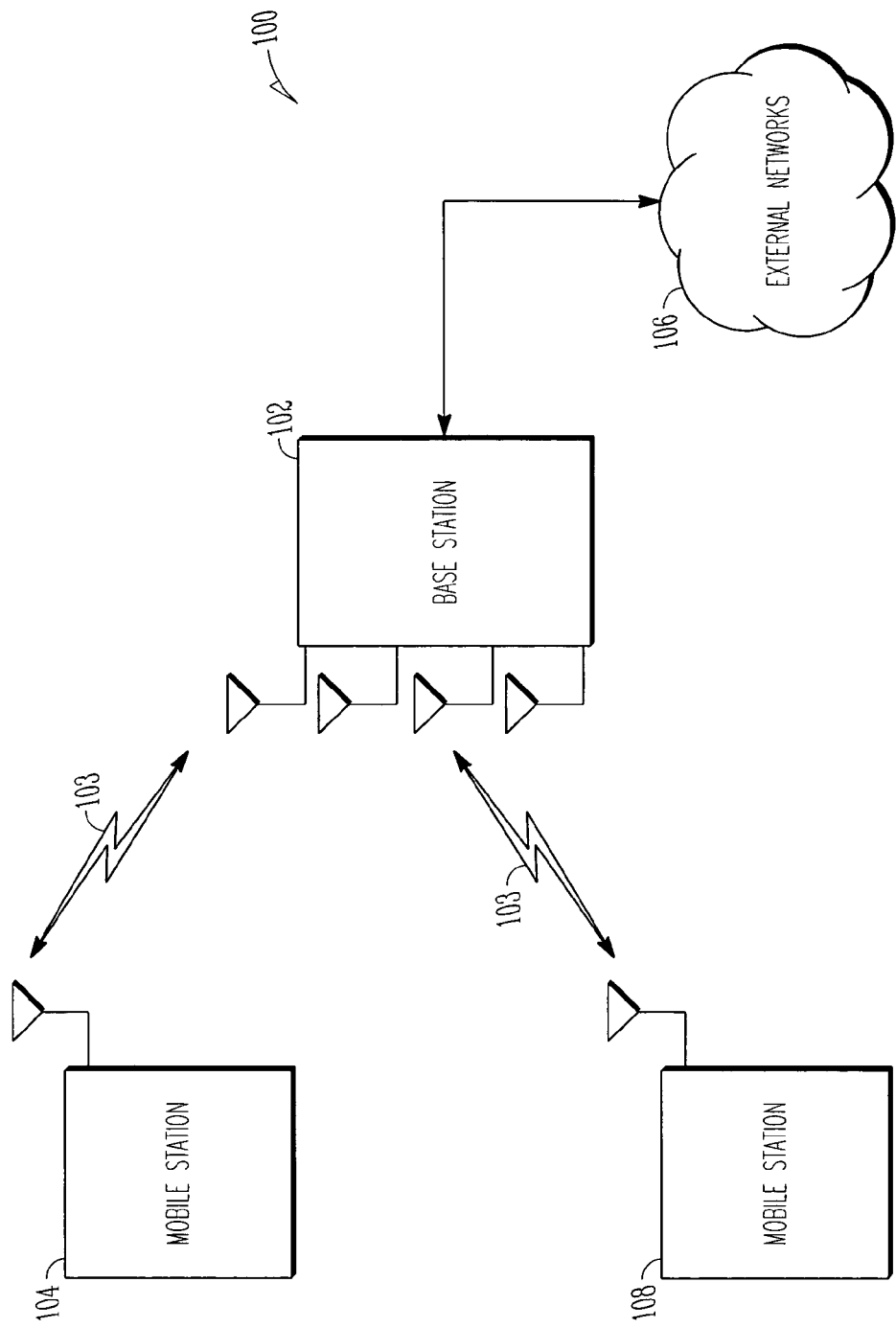
FIG. 1 illustrates a wireless communication network in accordance with some embodiments of the present invention.

FIG. 1 illustrates a wireless communication network in accordance with some embodiments of the present invention. Wireless communication network 100 includes base station 102 and one or more mobile stations 104 and 108. Base station 102 may coordinate communications with each of the one or more mobile stations 104 in a centralized manner and may allow the one or more mobile stations 104 and 108 to access external networks 106, such as the Internet. Base station 102 may also coordinate communications among the one or more mobile stations 104 and 108 including allocating uplink bandwidth to the one or more mobile stations 104 and 108, although the scope of the invention is not limited in this respect.

In accordance with some embodiments of the present invention, the one or more mobile stations 104 and 108 may provide poll-me (PM) indicators in MAC headers of uplink data transmissions 103 to base station 102 to request additional bandwidth for subsequent transmissions of established communication sessions. These embodiments may reduce the latency associated with using a contention channel access scheme to request additional bandwidth allowing network 100 to better support latency-sensitive but bursty applications, although the scope of the invention is not limited in this respect. These embodiments are described in more detail below.

The terms "base station" and "mobile station" are used herein for convenience to distinguish between particular communication stations of wireless network 100, however the scope of the invention is not limited in this respect, as a base station or a mobile station may refer to any wireless communication device. The term "generic MAC header", as used herein, may refer to any MAC layer header of a packetized transmission from a mobile station to a base station in a wireless network.

Figure 2:
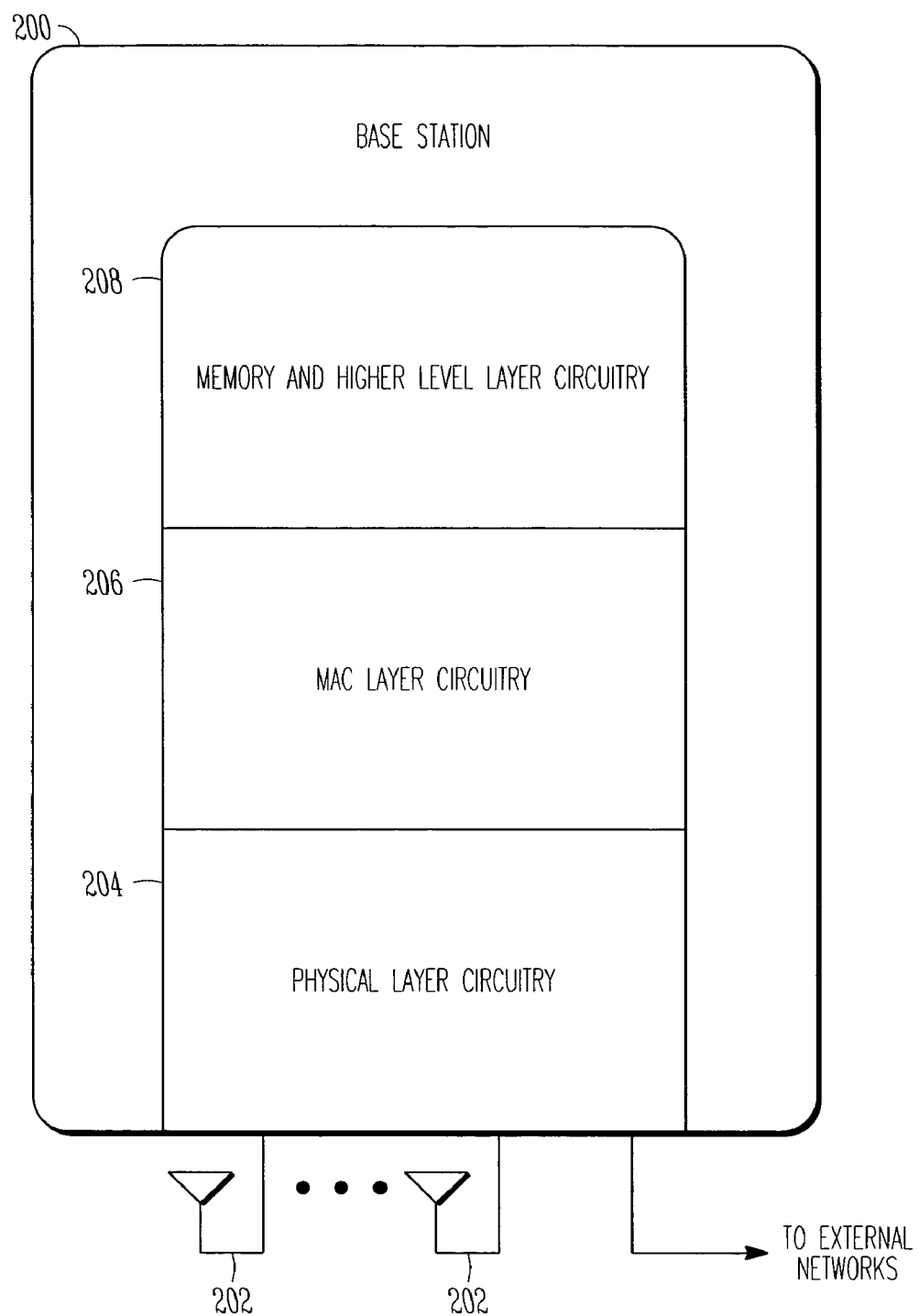
FIG. 2 is a functional block diagram of a base station in accordance with some embodiments of the present invention.

FIG. 2 is a functional block diagram of a base station in accordance with some embodiments of the present invention. Base station 200 may be suitable for use as base station 102 (FIG. 1), although other functional configurations may also be suitable. The configuration of base station 200 may also be suitable for use as one or more of mobile stations 104 and 108 (FIG. 1), although other configurations may also be suitable. Base station 200 includes physical (PHY) layer circuitry 204 for transmitting and receiving communication signals with antennas 202, media-access control (MAC) layer circuitry 206 for performing media-access control operations, and memory and higher-level layer circuitry 208. Physical layer circuitry 204 may also include circuitry for communicating with wireline networks, such as external networks 106 (FIG. 1). Although the term 'circuitry' is used to describe physical layer circuitry 204, MAC layer circuitry 206, and higher-level layer circuitry 208, physical layer circuitry 204, MAC layer circuitry 206, and/or higher-level layer circuitry 208 may be implemented with a combination of software, firmware and/or hardware.

In accordance with some embodiments, media-access control layer circuitry 206 may determine when a poll-me indicator is provided in a MAC header received from a mobile station, such as mobile station 104 (FIG. 1). The poll-me indicator may indicate that additional bandwidth is being requested by mobile station 104 (FIG. 1) for an established communication session.

In accordance with some embodiments, the poll-me indicator may be a poll-me bit that may be set in a generic MAC header, although the scope of the invention is not limited in this respect. Other indicators in MAC headers may also be used. Physical layer circuitry 204 may transmit a bandwidth allocation message to mobile station 104 (FIG. 1). In some Worldwide Interoperability for Microwave Access (WiMAX) embodiments, the additional bandwidth may comprise a subsequent orthogonal frequency division multiple access (OFDMA) slot for a subsequent uplink data transmission burst, although the scope of the invention is not limited in this respect. In some embodiments, the additional bandwidth is being requested because no subsequent OFDMA slot is currently assigned although mobile station 104 may have additional data to transmit.

FIG. 3 is a table illustrating example fields of a generic media-access control (MAC) header in accordance with some embodiments of the present invention. Table 300 illustrates examples of fields of a generic MAC header in column 302 and examples of their respective size in column 304. A poll-me (PM) bit is illustrated in field 306 and a connection identifier, discussed below, is illustrated in field 308. The poll-me bit illustrated in field 306 may be used as a poll-me indicator, although the scope of the invention is not limited in this respect. Table 300 illustrates an example of a generic MAC header and the scope of the invention is not limited to the specific fields, the order of the fields and/or the size of the fields illustrated in table 300.

Referring to FIGS. 1, 2 and 3 together, in some embodiments, a connection identifier (i.e., a connection ID) may be associated with mobile station 104 for a communication session established prior to the receipt of the poll-me indicator in the generic MAC header. In some embodiments, the poll-me indicator, when set, may indicate that mobile station 104 is requesting a subsequent OFDMA slot for transmission of data as part of the established communication session, although the scope of the invention is not limited in this respect.

In some embodiments, the poll-me indicator may be provided in a generic MAC header of data packets of the established communication session. In these embodiments, mobile station 104 may have been previously assigned an OFDMA slot in the uplink to transmit a data unit, including the generic MAC header. The assigned slot may have been assigned when the communication session was initially established or in response to a prior request for additional bandwidth during a previous transmission of uplink data (e.g., within a previously assigned OFDMA slot), although the scope of the invention is not limited in this respect.

In some embodiments, the poll-me indicator of a generic MAC header may be able to be set on any MAC protocol data unit (PDU) in the uplink communicated from a mobile station to a base station, although the scope of the invention is not limited in this respect.

In some embodiments, the poll-me indicator may be viewed as a bit that is used by mobile station 104 in a header of a current uplink data unit to request base station 102 to poll mobile station 104 for a bandwidth request. In other words, mobile station 104 uses the poll-me indicator to ask base station 102 to poll 'me' because mobile station 104 is ready to ask for bandwidth.

In some embodiments, the communication session may be a best effort (BE) type of communication session in which base station 102 allocates bandwidth to one or more mobile stations, such as mobile stations 104 and 108, based on the available bandwidth. In these embodiments, mobile stations 104 and 108 may request bandwidth on an as-needed basis during established communication sessions and may use the poll-me indicator in the generic MAC header, although the scope of the invention is not limited in this respect.

In some embodiments, the communication session may be a polling service (PS) type of communication session may be established in which base station 102 "polls" one or more mobile stations, such as mobile stations 104 and 108, to check whether or not bandwidth is needed. As part of the response to the poll, a mobile station may request bandwidth using a bandwidth request data unit. Based on this, base station 102 may allocate bandwidth. As part of a MAC data unit transmitted in the granted bandwidth, mobile stations 104 and 108 may use the poll-me indicator in the MAC header, although the scope of the invention is not limited in this respect.

Other types of communication sessions may also be established between base station 102 and one or more mobile stations 104 and 108. For example, mobile station 104 may establish an unsolicited grant service (UGS) type of communication session with base station 102. In UGS-type communication sessions, base station 102 may provide a continuous stream of bandwidth grants to mobile station 104 without mobile station 104 having to request bandwidth in subsequent slots. Mobile station 104 may, for example, establish a UGS-type communication session for real-time and streaming applications. In UGS-type communication sessions, a poll-me bit may be set in a grant-management subheader of ongoing UGS packets to initiate a request for additional bandwidth beyond the automatically allocated amount. This additional requested bandwidth may be used for current applications on mobile station 104 or for other applications. The grant-management subheader of packets of the UGS-type sessions is distinguishable from the generic MAC header. In the generic MAC header, the poll-me indicator may be provided in non-UGS-type sessions to request additional bandwidth because in non-UGS-type sessions, no bandwidth is automatically allocated.

In some embodiments, base station 102 may transmit a message, such as an allocation information element (e.g., an uplink map), to mobile station 104 indicating that a bandwidth allocation slot is available in response to receipt of the poll-me indicator provided in the generic MAC header. Base station 102 may receive, in response to the transmitted allocation information element, a bandwidth request data unit from mobile station 104 within the bandwidth allocation slot. The bandwidth request data unit may indicate an amount of bandwidth requested by mobile station 104. In some embodiments, the bandwidth request data unit transmitted by mobile station 104 may indicate the amount of bandwidth requested in bytes, although the scope of the invention is not limited in this respect.

In some embodiments, base station 102, in response to receipt of the bandwidth request data unit from mobile station 104, may transmit a bandwidth allocation message to mobile station 104 indicating an amount of bandwidth allocated to mobile station 104. In some embodiments, the bandwidth allocation transmitted to mobile station 104 comprises an allocation of one or more OFDMA slots comprising one or more subchannels of an OFDM channel. The bandwidth of the one or more OFDMA slots may correspond to and/or provide at least the amount of bandwidth requested by mobile station 104, although the scope of the invention is not limited in this respect.

In some embodiments, when the poll-me indicator is not set in the generic MAC header of data packets of an established communication session received from mobile station 104, base station 102 may refrain from transmitting an allocation information element to mobile station 104.

In some embodiments, mobile station 104 may refrain from using a higher-latency contention channel to request an allocation information element when mobile station 104 is able to set the poll-me indicator in the generic MAC header, although the scope of the invention is not limited in this respect. In some embodiments, mobile station 104 may use the contention channel to request an allocation information element for use in requesting additional bandwidth when mobile station 104 is not able to set the poll-me indicator. In these embodiments, mobile station 104 may use the contention channel when mobile station 104 is not currently assigned an OFDMA slot to transmit or when, at the time of the transmission of the current data unit, mobile station 104 does not know if it needs additional bandwidth for a subsequent transmission within the current communication session. In some embodiments, the contention channel may be a code division multiple access (CDMA) channel shared by a plurality of mobile stations, such as mobile stations 104 and 108. In these embodiments, when two mobile stations use the same code, they may interfere and neither mobile station may be properly received at base station 102. This may result in several attempts to request an allocation information element by a mobile station.

In some embodiments, the communication session established with mobile station 104 may allow mobile station 104 to operate in a push-to-talk PTT mode. In these embodiments, mobile station 104 may initially use the contention channel or the poll-me indicator (i.e., in case it has an earlier bandwidth allocation) to request bandwidth to start the connection. Once the initial bandwidth is granted to mobile station 104, it may transmit a data unit with a MAC header to base station 102. As part of the MAC header, mobile station 104 may set the poll-me indicator for further bandwidth requests for the push to talk connection.

In some embodiments, the communication session established with mobile station 104 may be a transmission control protocol (TCP) type connection. In these embodiments, mobile station 104 may initially use the contention channel or the poll-me indicator (i.e., in case it has an earlier bandwidth allocation) to request bandwidth to start the TCP-type connection. Once the initial bandwidth is granted to mobile station 104, it may transmit a data unit with a MAC header to base station 102. As part of the MAC header, mobile station 104 may set the poll-me indicator for further bandwidth requests for the subsequent transmission of TCP uplink data packets.

In some other embodiments, the communication session established with mobile station 104 may be an instant messaging (IM) session established between base station 102 and mobile station 104. In these embodiments, a poll-me indicator provided in the generic MAC header may indicate that bandwidth is requested to send an instant message.

Although base station 200 is illustrated in FIG. 2 as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 200 may refer to one or more processes operating on one or more processing elements.

In some embodiments, base station 102 and/or mobile stations 104 and 108 may be part of wireless communication devices that may communicate multicarrier signals, such as OFDMA communication signals. In some embodiments, base station 102 and/or mobile stations 104 and 108 may communicate over a multicarrier communication channel which may comprise a plurality of orthogonal subcarriers. In some embodiments, the orthogonal subcarriers may be closely spaced orthogonal frequency division multiplexed (OFDM) subcarriers. To help achieve orthogonality between the closely spaced subcarriers, each subcarrier may have a null at substantially a center frequency of the other subcarriers and/or each subcarrier may have an integer number of cycles within a symbol period, although the scope of the invention is not limited in this respect.

In some embodiments, base station 102 and/or mobile stations 104 and 108 may be part of wireless access point (AP), such as a Wireless Fidelity (WiFi), a WiMAX, or a broadband communication station, although the scope of the invention is not limited in this respect as base station 102 and/or mobile stations 104 and 108 may be part of almost any wireless communication device.

In some embodiments, the frequency spectrums for the multicarrier communication signals communicated between base station 102 and mobile stations 104 and 108 may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMAX embodiments, the frequency spectrum for communications may comprise frequencies between 2 and 11 GHz, although the scope of the invention is not limited in this respect.

In some embodiments, base station 102 and/or mobile stations 104 and 108 may communicate radio-frequency (RF) communications in accordance with specific communication standards, such as the Institute of Electrical and Electronics Engineers (IEEE) standards including the IEEE 802.16-2004 standard for wireless metropolitan area networks (WMANs) including variations and evolutions thereof (e.g., IEEE 802.16(e)), although base station 102 and mobile stations 104 and 108 may also be suitable to transmit and/or receive communications in accordance with other standards, including third-generation (3G) cellular standards. For more information with respect to IEEE 802.16 standards, please refer to "IEEE Standards for Information Technology—Telecommunications and Information Exchange between Systems—Metropolitan Area Network—Specific Requirements—Part 16" and related amendments/versions. In some other embodiments, base station 102 and/or mobile stations 104 and 108 may communicate in accordance with the Evolution Data Only (EvDO) requirements for CDMA 2000 systems, and/or the High Speed Downlink Packet Access (HSDPA) requirements for wide-band CDMA (WCDMA) systems, although the scope of the invention is not limited in this respect.

In some embodiments, base station 102 and/or mobile stations 104 and 108 may be part of one or more portable wireless communication devices, such as personal digital assistants (PDAs), laptop or portable computers with wireless communication capability, web tablets, wireless telephones, wireless headsets, pagers, instant messaging (IM) devices, digital cameras, access points, televisions or other devices that may receive and/or transmit information wirelessly.

Antennas 202 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

Figure 4:
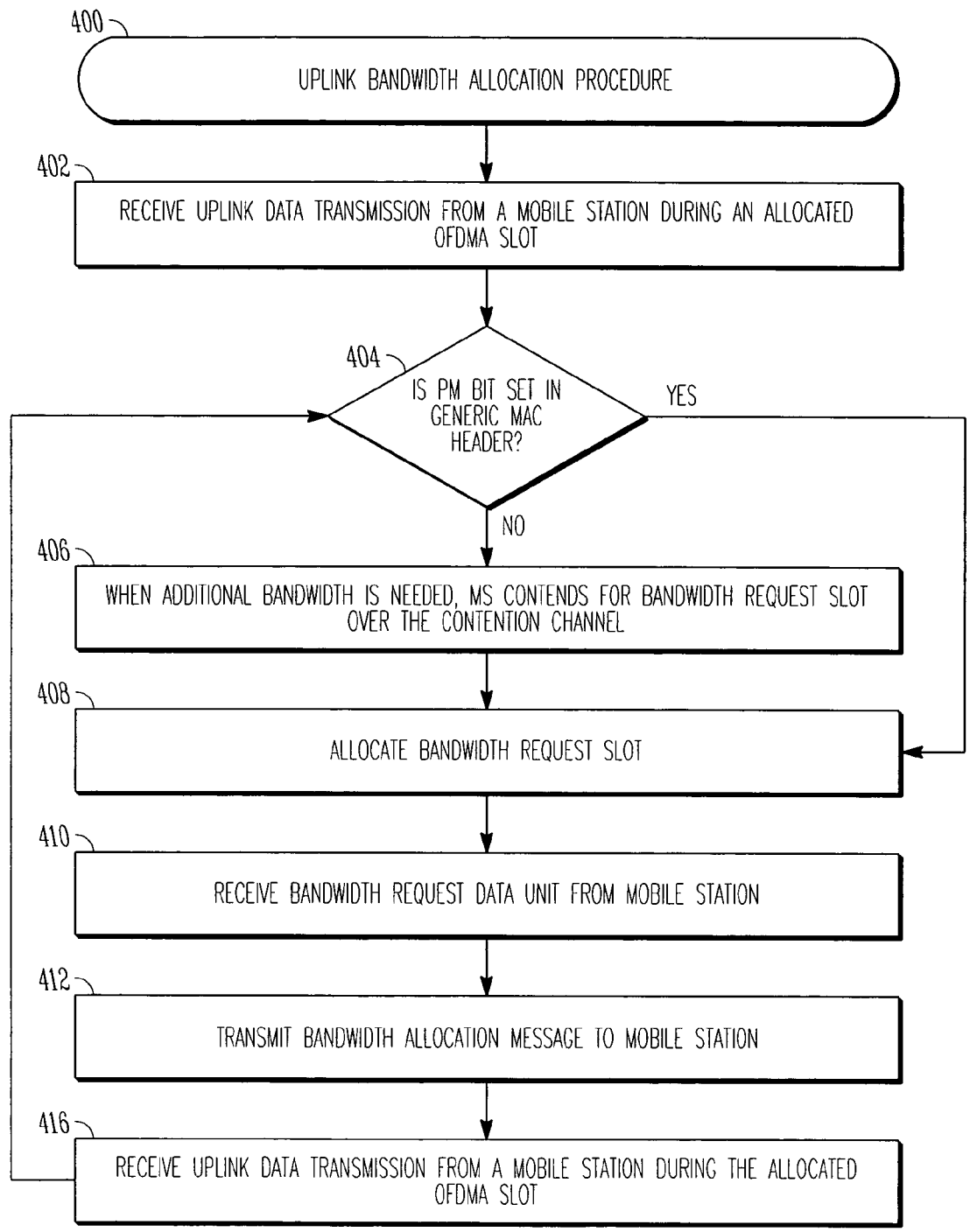
FIG. 4 is a flow chart of bandwidth allocation procedure in accordance with some embodiments of the present invention.

FIG. 4 is a flow chart of bandwidth allocation procedure in accordance with some embodiments of the present invention. Bandwidth allocation procedure 400 may be performed by a base station, such as base station 102 (FIG. 1) when communicating with one or more mobile stations, such mobile stations 104 and 108 (FIG. 1). In some embodiments, the operations of procedure 400 may be performed by MAC layer circuitry 206 (FIG. 2) and/or physical layer circuitry 204 (FIG. 2) of a base station, such as base station 200 (FIG. 2).

In operation 402, a base station may receive an uplink data transmission of an established communication session from a mobile station. The uplink data transmission may be received within a previously allocated OFDMA slot, although the scope of the invention is not limited in this respect. The uplink data transmission may be an uplink data packet that includes the connection identifier indicating a particular communication session with a particular mobile station.

In operation 404, the base station may determine whether or not a poll-me (PM) bit is provided in the generic MAC header of the uplink data transmission received in operation 402. When the poll-me indicator is provided, operation 408 may be performed. When the poll-me indicator is not set, operation 406 may be performed.

In operation 406, requests for additional bandwidth for the established communication session with the mobile station are received at the base station over the contention channel on an as-needed basis. In these embodiments, operation 406 is performed when a mobile station has not, for some reason, set the poll-me indicator in a prior uplink data transmission.

In operation 408, the base station may allocate an allocation information element to the mobile station. The allocation information element may indicate, for example, that an uplink OFDMA slot (e.g., 6 bytes) is available for the mobile station to transmit a bandwidth request to the base station. In accordance with some embodiments, the allocation information element may be provided to the mobile station in response to receipt of the poll-me indicator provided in the generic MAC header as determined in operation 404. The allocation information element may also be provided to the mobile station when requested over the contention channel in operation 406.

Operation 410 comprises receiving a bandwidth request from the mobile station. The bandwidth request may be a bandwidth request data unit and may be received, for example, in the (6 byte) uplink OFDMA slot indicated in the allocation information element, although the scope of the invention is not limited in this respect.

Operation 412 comprises transmitting the bandwidth allocation message to the mobile station in response to receipt of the bandwidth request in operation 410. The bandwidth allocation message may be provided to one or more mobile stations as part of a downlink map to inform associated mobile stations of assigned OFDMA slots of an uplink map.

Operation 416, the base station may receive an uplink data transmission from the mobile station within the allocated bandwidth, which may be within an allocated OFDMA slot. If the mobile station needs additional bandwidth for the current communication session, the mobile station may set the poll-me indicator in the generic MAC header of the uplink transmission. If the mobile station does not need additional bandwidth for the current communication session, or is currently unaware of a need for additional bandwidth for the current communication session, the mobile station may refrain from setting the poll-me indicator in the generic MAC header of the uplink transmission. After operation 416, operations 404 through 416 may be repeated in response to receipt of uplink data transmissions from the mobile station.

Although the individual operations of procedure 400 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing or processing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A base station comprising:
media access control (MAC) layer circuitry to determine when a poll-me indicator is provided in a MAC header of uplink data packets of an established communication session received from a mobile station, the poll-me indicator indicating that additional bandwidth is being requested by the mobile station for the established communication session; and
physical layer circuitry to transmit a bandwidth allocation message to the mobile station,
wherein the mobile station refrains from using a contention channel to request an allocation information element when the mobile station is able to set the poll-me indicator in the MAC header of uplink packets,
wherein the uplink data packets of the established communication session include a connection identifier associated with the mobile station,
wherein the communication session established with the mobile station allows the mobile station to operate in a push-to-talk mode,
wherein the mobile station transmits the MAC header with the poll-me indicator to the base station when a user initiates a transmission, and
wherein upon receipt of a bandwidth allocation from the base station, the mobile station provides either an audio or visual indication to the user to either transmit or talk.

2. The base station of claim 1 wherein a connection identifier is associated with the mobile station for a communication session established prior to the receipt of the poll-me indicator in the MAC header, wherein the poll-me indicator, when set, indicates that the mobile station is requesting a subsequent orthogonal frequency division multiple access (OFDMA) slot for transmission of data as part of the communication session.

3. The base station of claim 2 wherein the base station transmits the allocation information element indicating a bandwidth allocation slot to the mobile station in response to receipt of the poll-me indicator provided in the MAC header, and wherein the base station receives, in response to the transmitted allocation information element, a bandwidth request data unit from the mobile station within the bandwidth allocation slot, the bandwidth request data unit indicating an amount of bandwidth requested by the mobile station.

4. The base station of claim 3 wherein the base station, in response to receipt of the bandwidth request data unit from the mobile station, transmits the bandwidth allocation message to the mobile station indicating an amount of bandwidth allocated to the mobile station.

5. The base station of claim 4 wherein the bandwidth allocation transmitted to the mobile station comprises an allocation of one or more OFDMA slots comprising one or more subchannels of an OFDM channel, the bandwidth of the one or more OFDMA slots corresponding to at least the amount of bandwidth requested by the mobile station.

6. The base station of claim 3 wherein when the poll-me indicator is not set in the MAC header received from the mobile station, the base station refrains from transmitting the allocation information element to the mobile station.

7. The base station of claim 6 wherein the mobile station is to use the contention channel to request an allocation information element for use in requesting additional bandwidth when the mobile station is not able to set the poll-me indicator.

8. The base station of claim 6 wherein the contention channel is a code division multiple access channel shared by a plurality of mobile stations.

9. A wireless communication network comprising a base station and one or more mobile stations, wherein the one or more mobile stations provide poll-me indicators in a MAC headers of uplink data packets of established communication sessions to the base station to request additional bandwidth for subsequent transmissions of established communication sessions, wherein the mobile stations refrain from using a contention channel to request an allocation information element when the mobile stations are able to set the poll-me indicator in the MAC header of uplink packets, wherein the uplink data packets of the established communication sessions include a connection identifier associated with each mobile station, wherein the communication sessions allow the mobile stations to operate in a push-to-talk mode, wherein the mobile stations transmit MAC header with the poll-me indicator to the base station when a user initiates a transmission, and wherein upon receipt of a bandwidth allocation from the base station, the mobile stations provide either an audio or visual indication to the user to either transmit or talk.

10. The wireless communication network of claim 9 wherein the poll-me indicator, when set, indicates that the mobile station is requesting a subsequent orthogonal frequency division multiple access (OFDMA) slot for transmission of data as part of the communication session, wherein the base station transmits the allocation information element indicating a bandwidth allocation slot to the mobile station in response to receipt of the poll-me indicator provided in the MAC header, and wherein the base station receives, in response to the transmitted allocation information element, a bandwidth request data unit from the mobile station within the bandwidth allocation slot, the bandwidth request data unit indicating an amount of bandwidth requested by the mobile station.

\* \* \* \* \*